United States Patent [19]

Ogawa

[11] Patent Number: 5,057,339
[45] Date of Patent: Oct. 15, 1991

[54] METALLIZED POLYACETYLENE-TYPE OR POLYACENE-TYPE ULTRALONG CONJUGATED POLYMERS AND PROCESS FOR PRODUCING THE SAME

[75] Inventor: Kazufumi Ogawa, Hirakata, Japan

[73] Assignee: Matsushita Electric Industrial Co., Ltd., Osaka, Japan

[21] Appl. No.: 448,237

[22] Filed: Dec. 11, 1989

[30] Foreign Application Priority Data

Dec. 29, 1988 [JP] Japan ................................ 63-333288
Jan. 9, 1989 [JP] Japan ................................ 1-002424

[51] Int. Cl.$^5$ ............................................. B05D 1/18
[52] U.S. Cl. ................................... 427/340; 427/341; 427/430.1; 428/420; 428/447
[58] Field of Search .................... 427/340, 341, 430.1; 428/420, 447

[56] References Cited

U.S. PATENT DOCUMENTS

| | | | |
|---|---|---|---|
| 4,539,061 | 9/1985 | Sagiv ................................ | 428/420 X |
| 4,828,917 | 5/1989 | Wegner et al. ................. | 427/430.1 X |
| 4,886,685 | 12/1989 | Wegner et al. ................. | 427/430.1 |
| 4,996,075 | 2/1991 | Ogawa et al. ................... | 427/430.1 X |

Primary Examiner—Michael Lusignan
Attorney, Agent, or Firm—Stevens, Davis, Miller & Mosher

[57] ABSTRACT

A process for producing a metallized polyacetylene-type ultralong conjugated polymer comprising immersing a substrate having a hydrophilic surface in a first nonaqueous organic solution containing a compound containing an acetylenic group (—C≡C—) and

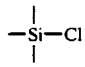

group (hereinafter referred to as silane-type surfactant) to deposit a chemisorbed layer of the silane-type surfactant on the substrate by chemisorption, immersing the substrate on which the chemisorbed layer is deposited in an aqueous solution containing a metal ion to replace a hydrogen atom connected to the acetylenic group by the metal atom, and immersing the substrate on which the chemisorbed layer is deposited in a second organic solution containing a metal salt catalyst to polymerize the molecules at the acetylenic group in the chemisorbed layer. A process according to the present invention makes it possible to obtain a metallized polyacetylene-type ultralong conjugated polymer which has excellent electrical conductivity and nonlinear optical effects and which is stable. Further, the present invention gives a metallized polyacene-type ultralong conjugated polymer.

24 Claims, 10 Drawing Sheets

REPLACEMENT BY Ag

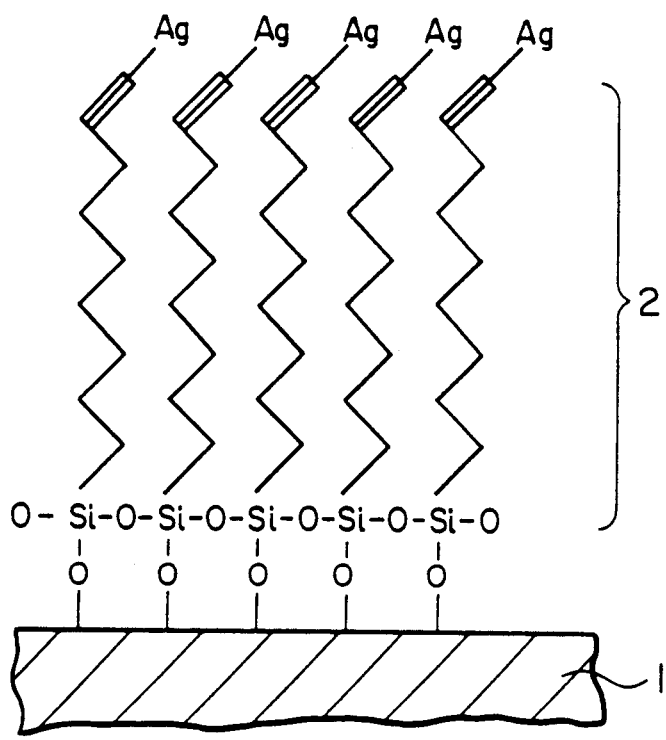
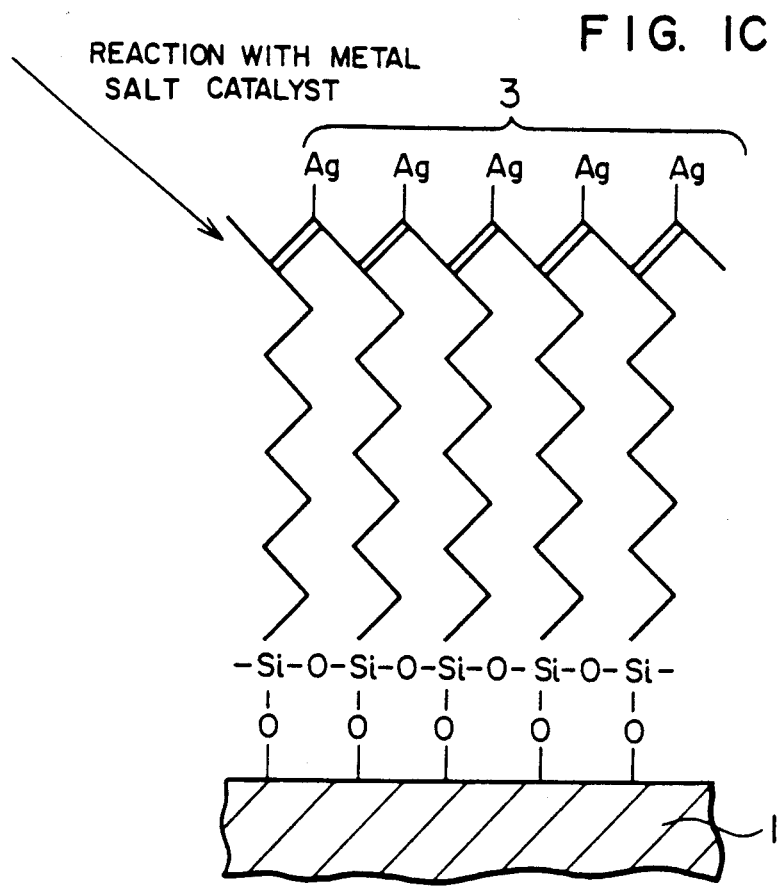

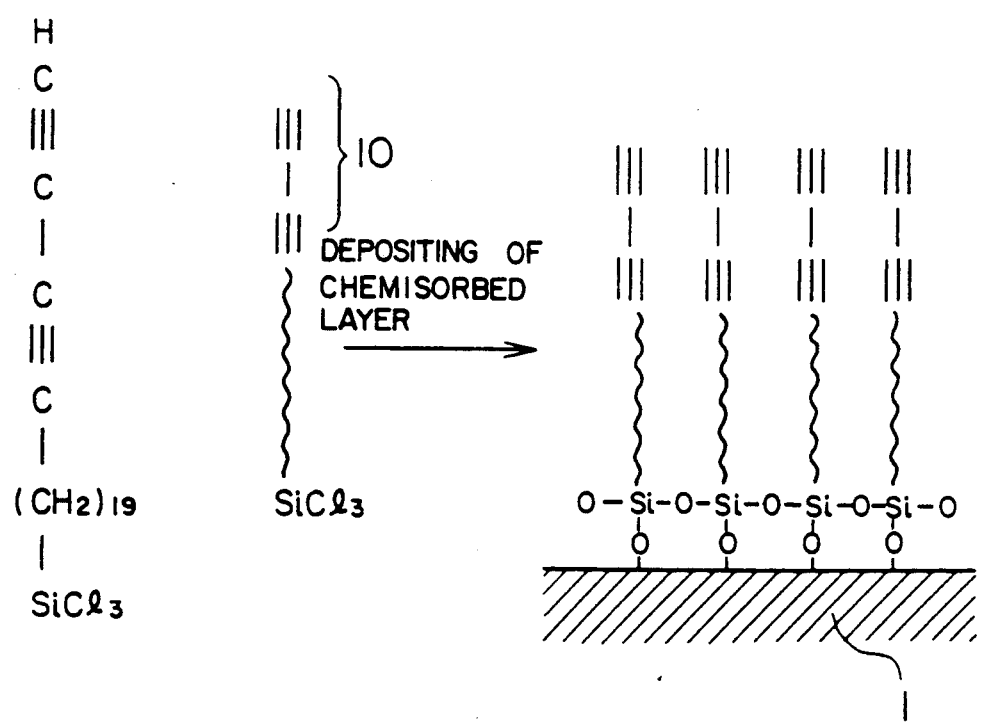

POLYMERIZATION WITH METAL SALT CATALYST

POLYMERIZATION BY IRRADIATION WITH HIGH ENERGY BEAM →

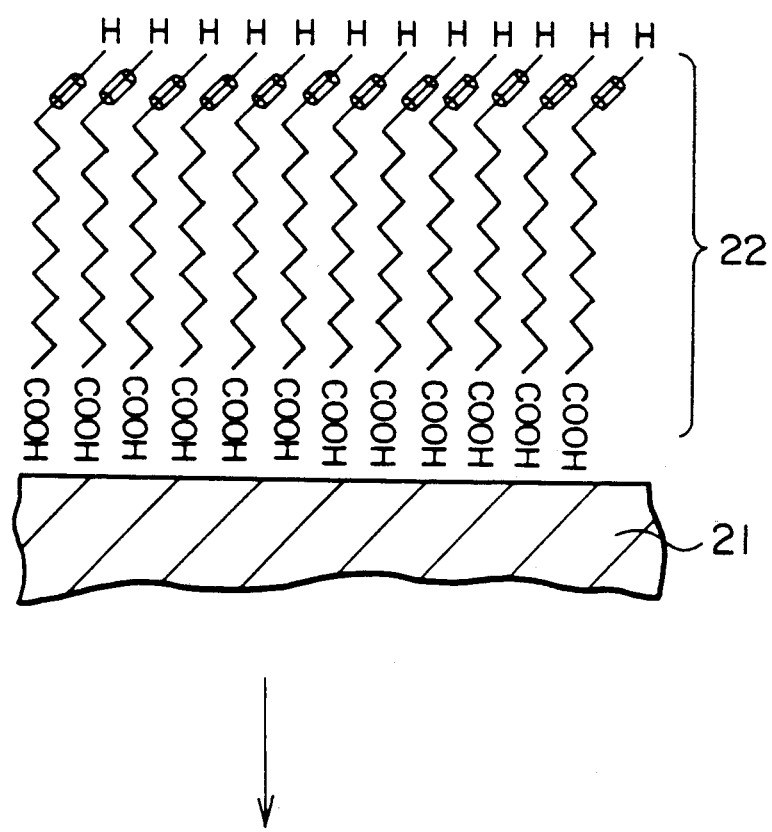

FIG. 6A    FIG. 6B    FIG. 6C
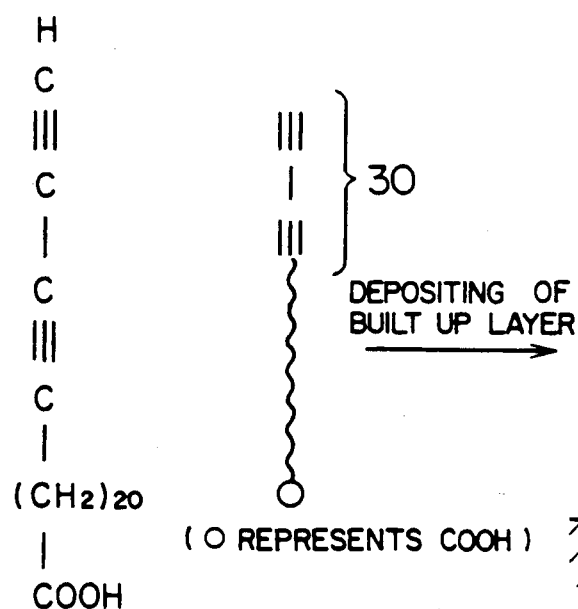
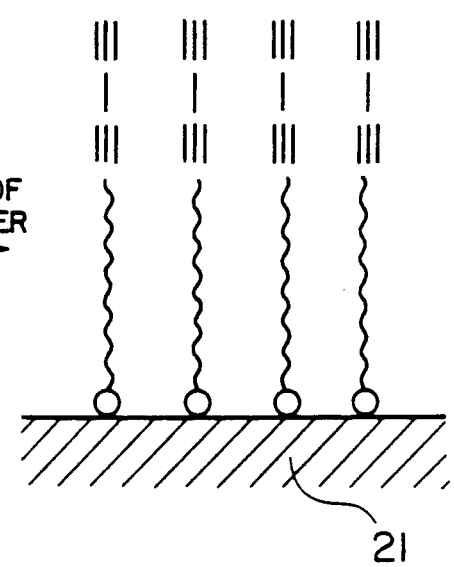

POLYMERIZATION WITH METAL SALT CATALYST

POLYMERIZATION BY IRRADIATION WITH HIGH ENERGY BEAM

METALLIZED POLYACETYLENE-TYPE OR POLYACENE-TYPE ULTRALONG CONJUGATED POLYMERS AND PROCESS FOR PRODUCING THE SAME

BACKGROUND OF THE INVENTION

1. FIELD OF THE INVENTION

The present invention relates to metallized polyacetylene- or polyacene-type ultralong conjugated polymers, which are organic compounds which exhibit electrical conductivity and nonlinear optical effects and have acetylene bonds, and a process for producing the same.

2. DESCRIPTION OF RELATED ART

Polymers of acetylene derivatives have, in their molecule, a one-dimensional main chain having a $\pi$-electron conjugated bond system, and therefore exhibit electrical conductivity and nonlinear optical effects. For this reason, they are under study in many areas as optical function materials and electronic function materials.

As a process for producing polyacetylene, well known is a polymerization process of Shirakawa et al., which uses a Ziegler-Natta catalyst.

However, presently known polyacetylene derivatives are unstable to heat, pressure, UV light, etc. in oxygen-containing atmosphere.

Thus, studies have been being made to stabilize acetylene derivative polymers, and yet, no stabilization method has been found.

Further, concerning polyacetylenes produced by conventional solution polymerization and by the polymerization process of Shirakawa et al., it is difficult to form a conjugated bond system having a sufficient length, since their polymerization directions are random.

Furthermore, although polyacene has been being studied which is theoretically expected to have high electrical conductivity, polyacene having sufficiently high electrical conductivity has not yet been obtained.

It is known that the use of a linear hydrocarbon derivative having one terminal

group makes it possible to produce a chemisorbed layer on a hydrophilic substrate surface in a nonaqueous organic solvent very easily by chemisorption. Further, a surface of a chemisorbed layer deposited by the above method can be provided with hydrophilic property by attaching specific substituents to the surface in advance and then carrying out a chemical reaction. Thus, it is also known that a chemisorbed built up film consisting of chemisorbed layers can be formed accordingly (J. Sagiv, U.S. Pat. No. 4,539,061).

Hence, when a compound having a diacetylenic group in part of its linear hydrocarbon chain is used to carry out chemisorption, it is possible to deposit a chemisorbed layer of a diacetylene derivative having a monolayer film thickness of the order of several tens angstroms, and it is further possible to obtain a chemisorbed built up film easily.

Further, when chemisorption is carried out using a compound having an acetylenic group in part of its linear hydrocarbon chain, it is possible to deposit a chemisorbed layer of an acetylene derivative having a monolayer film thickness of the order of several tens angstroms, and it is also possible to easily obtain a chemisorbed built up film.

On the other hand, in a monomolecular layer formation, when an amphiphilic acetylene derivative having hydrophobic and hydrophilic groups is used, a monomolecular film can be formed on a water surface, and further, a built up film can be formed according to a Langmuir-Blodgett technique.

SUMMARY OF THE INVENTION

The present invention has found that a metallized polyacetylene having an ultrahigh molecular weight and a very long conjugated bond system and being stable in oxygen-containing atmosphere can be formed by preparing a monomolecular layer according to the above process, immersing the deposited monomolecular layer in an aqueous solution containing a metal ion of Ag, Cu, etc. to replace a hydrogen atom connected to the acetylenic group or diacetylenic group by the above metal atom under an acetylide reaction, and then immersing the deposited monomolecular layer in an organic solution containing a metal salt catalyst to polymerize the molecules at the acetylenic group in the above monomolecular layer.

That is, it has been found that a metallized polymer having a continuous conjugated bond system, linear chain and ultrahigh molecular weight (hereinafter also referred to as ultralong conjugated polymer) can be produced by polymerizing molecules of a metallized acetylene derivative using a metal salt catalyst while constant orientation of the molecules is maintained.

The present invention relates to a process for producing a metallized polyacetylene-type ultralong conjugated polymer comprising immersing a substrate having a hydrophilic surface in a first nonaqueous organic solution containing a compound containing an acetylene group (—C≡C—) and

group (hereinafter also referred to as silane-type surfactant) to deposit a chemisorbed layer of the silane-type surfactant on the substrate by chemisorption, immersing the substrate on which the chemisorbed layer is deposited in an aqueous solution containing a metal ion to replace a hydrogen atom connected to the acetylenic group by the metal atom, and immersing the substrate on which the chemisorbed layer is deposited in a second organic solution containing a metal salt catalyst to polymerize the molecules in the chemisorbed layer at the acetylenic group, and the present invention also relates to said polymer.

Further, the present invention relates to a process for producing an ultralong conjugated polymer comprising spreading an organic solution of a compound containing an acetylenic group (—C≡C—) and carboxyl group (—COOH) (hereinafter referred to as amphiphilic compound) on a water surface, evaporating a solvent of the organic solution, collecting the molecules of the amphiphilic compound remaining on the water surface in the direction of the water surface with a barrier on the water surface, applying a surface pressure to form a monomolecular film on the water surface, moving the substrate upward and downward such that the substrate crosses the monomolecular film under the surface pressure to prepare a built up layer on the substrate (hereinafter this building up method is referred to as Langmuir-Blodgett technique (LB technique), and a monomolecular layer prepared according to LB technique is also referred to as a built up layer), immersing the substrate on which the built up layer is prepared in an aqueous solution containing a metal ion to replace a hydrogen atom connected to the acetylenic group by the metal atom, and immersing the substrate on which the built up layer is prepared in an organic solution containing a metal salt catalyst to polymerize the molecules at the acetylene group.

The present invention further relates to a process for producing a metallized polyacene-type ultralong conjugated polymer comprising irradiating a polyacetylene-type ultralong conjugated polymer obtained from a diacetylene derivative with a high energy beam, and it also relates to said polymer.

An object of the present invention is to provide metallized polyacetylene-type and metallized polyacene-type ultralong conjugated polymers, which are organic compounds exhibiting electrical conductivity or nonlinear optical effects and having a polyacetylenic bond.

Other objects and advantages of this invention will be apparent from the following description.

BRIEF DESCRIPTION OF THE DRAWINGS

FIG. 1B shows a schematic view of an enlarged cross section, in a molecular order, of a substrate and a chemisorbed layer in which the terminals of NTS of the chemisorbed layer are replaced by Ag.

FIG. 1C shows a schematic view of an enlarged cross section, in a molecular order, of a substrate and a chemisorbed layer in which a metallized trans-polyacetylene is formed by polymerization.

FIG. 3A to FIG. 3F show schematic views of production steps of a metallized polyacene-type ultralong conjugated polymer in a molecular order.

FIG. 4A shows a schematic view of an enlarged cross section, in a molecular order, of a substrate on which a built up layer of ω-tricosynoic acid (hereinafter also referred to as TCA) is prepared.

FIG. 6A to FIG. 6F show schematic views of production steps of a metallized polyacene-type ultralong conjugated polymer in a molecular order.

PREFERRED EMBODIMENT OF THE INVENTION

Figure 1A:
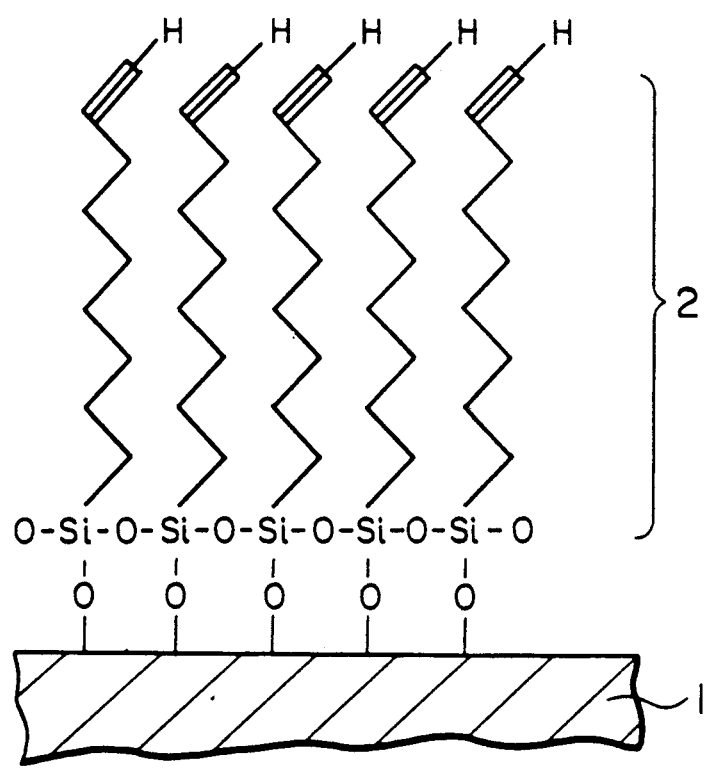
FIG. 1A shows a schematic view of an enlarged cross section, in a molecular order, of a substrate on which one chemisorbed layer of a $CH\equiv C(CH_2)_{17}SiCl_3$ (hereinafter also referred to as NTS) is deposited.

The polyacetylene-type polymer according to the present invention is produced by immersing a substrate having a hydrophilic surface in a first nonaqueous organic solution containing a silane-type surfactant to deposit a chemisorbed layer of the silane-type surfactant on the surface of the substrate by chemisorption, immersing the substrate on which the chemisorbed layer is deposited in an aqueous solution containing metal ions to replace hydrogens of acetylene or diacetylene groups by the metal ions, and immersing the substrate on which the chemisorbed layer is deposited in a second organic solution containing a metal salt catalyst to polymerize the molecules at the acetylenic group in the chemisorbed layer.

In the present invention, chemisorption stands for adsorption taking place in the interface between a phase of a substrate and a phase of the silane-type surfactant according to chemical bonding force.

Solvents for the above first nonaqueous organic solution include hexadecane, carbon tetrachloride, chloroform and the like and a mixture thereof.

Solvents for the above second organic solution include toluene, dioxane, anisole or the like. Anisole, dioxane and the like are among oxygen-containing organic solvents.

The silane-type surfactants stand for straight hydrocarbon chain compounds having an acetylenic group or diacetylenic group on the terminal and a

group on the other terminal, and include compounds represented by the following formulae (I) and (II):

wherein n denotes an integer of from 14 to 24, tricosadiynoictrichlorosilane ($HC\equiv C-C\equiv C-(CH_2)_{19}-SiCl_3$) or the like, and a $(CH_3)_3Si-$ group may replaced by $(CH_3)_2-SiH-$ group.

When the chemisorption is carried out using the above silane-type surfactant, it is possible to deposit a chemisorbed layer of the silane-type surfactant having a thickness of the order of several tens angstroms, and it is further possible to easily obtain a multilayered, chemisorbed built up film after irradiating a surface of the chemisorbed layer with a high energy beam in oxygen-containing or nitrogen-containing atmosphere to make the surface hydrophilic.

For example, using the silane-type surfactant of the above formula (I), a chemisorbed layer is deposited, by chemisorption, on a surface of an Si substrate on which an SiO$_2$ film is formed. In this case,

group and —OH group, which is formed on the surface of the substrate together with SiO$_2$, react with each other to form a monomolecular layer of with each other to form a monomolecular layer of

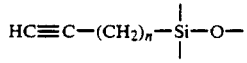

by dehydrochloroination.

Specifically, a Si substrate on which SiO$_2$ is formed is immersed in a solution of $2.0 \times 10^{-3} \sim 5.0 \times 10^{-3}$ mol/L of the above silane-type surfactant in a mixed solvent of 80% of n-hexadecane, 12% of carbon tetrachloride and 8% of chloroform at room temperature for several minutes, to form a

bond on the SiO$_2$ surface.

When the silane-type surfactant of the above formula (II) is used to stabilize an acetylenic group on the terminal of the molecule, a substrate on which a chemisorbed layer of the above silane-type surfactant is deposited is immersed in a 10% KOH aqueous solution after the chemisorption, to eliminate —Si(CH$_3$)$_3$ group, whereby a chemisorbed layer of

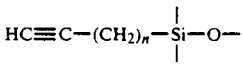

is similarly formed.

The chemisorbed layer prepared according to the above process is further immersed in an aqueous solution containing a metal ion such as Ag, Cu or the like to replace a hydrogen atom connected to the acetylenic group or the diacetylenic group by the metal atom under a metal acetylide reaction, and then immersed in a second organic solution containing a metal salt catalyst to polymerize molecules at the acetylenic group in the chemisorbed layer, whereby there is formed a metallized polyacetylene-type ultralong conjugated polymer which has an ultrahigh molecular weight and a very long conjugated bond system of over several hundreds monomer units and which is stable even in oxygen-containing atmosphere.

That is, molecules of a metallized acetylene derivative or a metallized diacetylene derivative are polymerized using a metal salt catalyst while orientation of the molecules is maintained, whereby it is possible to produce a polymer having a continuous conjugated bond system, straight chain and ultrahigh molecular weight (an ultralong conjugated polymer).

The foregoing explains a process for preparing one chemisorbed layer by the chemisorption and carrying out the polymerization. However, the polymerization may be carried out after a plurality of the chemisorbed layers are built up, or deposition of a chemisorbed layer and polymerization reaction may be repeated alternately in a plurality of times.

On the other hand, it is well known that a monomolecular film is formed on a water surface using an amphiphilic compound having a hydrophobic group and a hydrophilic group, and further that the monomolecular layer are built up on a solid substrate by LB technique.

The LB technique is considered to be promising, in recent developments of molecular devices in which functions are imparted to molecules themselves, as their constitution means. The LB technique makes it possible to prepare a built up layer of an amphiphilic compound in the order of a several tens angstroms, and further makes it possible to form a built up film consisting of the built up layers.

The metallized polyacetylene-type ultralong conjugated polymer according to the present invention can therefore be produced by spreading an organic solution of the above amphiphilic compound on a water surface, evaporating a solvent of the solution, then collecting molecules of the amphiphilic compound remaining on the water surface in the direction of the water surface with a barrier, moving a substrate upward and downward to prepare a built up layer of the amphiphilic compound, further immersing the substrate on which the built up layer is prepared in an aqueous solution containing a metal ion such as Ag, Cu or the like to replace a hydrogen atom connected to the acetylenic group or the diacetylenic group by the metal atom under a metal acetylide reaction, and further immersing the substrate on which the built up layer is prepared in an organic solution containing a metal salt catalyst to polymerize the molecules at the acetylenic group in the built up layer.

Further, when the above built up film is prepared, a d.c. voltage may be applied in the direction of the water surface while a surface pressure is applied to the molecules.

An inorganic salts such as CaCl$_2$, CdCl$_2$ or the like, may be dissolved in the water.

Amphiphilic compounds include amphiphilic acetylene derivatives such as compounds represented by the following formulae:

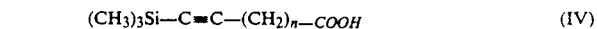

wherein n denotes an integer of from 14 to 23, and the like, and amphiphilic diacetylene derivatives such as pentacosadiynoic acid (HC≡C—C≡C—(CH$_2$)$_{20}$—COOH) or the like.

In addition, when the amphiphilic compound of the above formula (IV) is used to stabilize acetylenic group on the terminal of the molecule, the substrate on which the built up layer of said compound is prepared is immersed in a 10% KOH aqueous solution after the preparation of the built up layer to eliminate the —Si(CH$_3$)$_3$ group, whereby a monomolecular layer of HC≡C—(CH$_2$)$_n$—COOH is formed.

The built up layer prepared according to the above process is further immersed on an aqueous solution containing a metal ion such as Ag, Cu or the like to replace a hydrogen atom connected to the acetylenic group or the diacetylenic group by the metal atom under a metal acetylide reaction, and then the film is immersed in an organic solution containing a metal salt catalyst to polymerize the molecules at the acetylenic group in the built up layer, whereby there is formed a metallized polyacetylene-type ultralong conjugated polymer which has an ultrahigh molecular weight and a very long conjugated bond system of over several hundreds monomer units and which is also stable even in oxygen-containing atmosphere.

According to the above process, there is formed a metallized polyacetylene-type ultralong conjugated polymer which has an ultrahigh molecular weight and a very long conjugated bond system and which is also stable even in oxygen-containing atmosphere. That is, a polymer having a continuous linear conjugated bond system and ultrahigh molecular weight (an ultralong conjugated polymer) can be produced by polymerizing molecules of the amphiphilic compound using a metal salt catalyst while maintaining their constant orientation.

Also, a d.c. voltage of 10 to 60 V may be applied when molecules of the amphiphilic compound are collected on the water surface in the direction of the water surface with a surface pressure exerted on the molecules. In this case, the molecules as monomers exhibit further better orientation, and there can be produced a metallized polyacetylene-type ultralong conjugated polymer having a longer conjugated bond system.

The solvent for the organic solution containing a metal halide catalyst is identical with that for the second organic solution discussed previously.

In the present invention, metal ions include an ion of Ag, Cu or the like. These metal ions are supplied, e.g., from an aqueous solution of silver nitrate ($AgNO_3$), copper ammonium hydroxide ($Cu(NH_3)_2OH$) or the like.

In the present invention, metal salt catalysts include $MoCl_5$, $WCl_6$, $NbCl_5$, $TaCl_5$, $Mo(CO)_5$, $W(CO)_6$, $Nb(CO)_5$, $Ta(CO)_5$ or the like. The metal salt catalyst may be used in combination with an organic Sn or organic Bi compound serving as a co-catalyst.

In the present invention, a substrate stands for a hydrophilic substrate such as a Si substrate having a surface on which an $SiO_2$ is formed and the like.

Further, in the present invention, a metallized polyacene-type ultralong conjugated polymer can be obtained by irradiating a polyacetylene-type ultralong conjugated polymer, which is obtained from a silane-type surfactant having a diacetylene group or from an amphiphilic diacetylene derivative by the aforementioned chemisorption or LB technique, with a high energy beam for polymerization.

High-energy beams include electron rays, X-rays, gamma rays or the like.

The foregoing explains a process which comprises preparing one layer of a built up layer and carrying out polymerization. It has been found, however, that a metallized polyacetylene-type ultralong conjugated polymer film can be produced by carrying out a reaction for the polymerization after a built up film consisting of the built up layers is formed, or by repeating the building up step and the polymerization step alternately in a plurality of times.

In addition, it is expected that a metallized polyacetylene or metallized polyacene, which has a several tens centimeters long or more than several meters long conjugated bond system, a straight chain and an ultrahigh molecular weight and is stable, can be produced by optimizing types of acetylene and diacetylene derivative monomers as raw material silane-type surfactants or amphiphilic compounds and production conditions in the future. Hence, it is expected that a process according to the present invention makes it possible to produce an organic superconductive substance without any need of cooling.

According to the present invention, it is possible to produce, at high efficiency, a metallized polyacetylene having excellent electrical conductivity and nonlinear optical effects and being stable.

Further, according to the present invention, it is theoretically possible to produce a straight chain, ultrahigh molecular weight, metallized polyacetylene having a continuous conjugated bond system of several millimeters or more than several centimeters long. Thus, a process according to the present invention is very effective for making devices utilizing nonlinear optical effects.

The present invention is explained more specifically below referring to Examples. However, the present invention should not be construed to be restricted to the Examples.

EXAMPLE 1

An example using ω-nonadecylynoictrichlorosilane ($CH\equiv C-(CH_2)_{17}-SiCl_3$, hereinafter referred to as NTS) which is one of silane-type surfactants and has one acetylene group on the terminal is explained.

A Si substrate 1 (having a diameter of 3 inches) on which $SiO_2$ was formed was immersed in a solution of $3.0\times 10^{-3}$ mol/L of NTS in a mixed solvent of 80% of n-hexane, 12% of carbon tetrachloride and 8% of chloroform at room temperature under humidity-free $N_2$ atmosphere for 30 minutes to deposit an

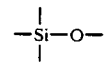

bond on the $SiO_2$ surface (FIG. 1A).

It was confirmed from FTIR that a chemisorbed layer 2 of

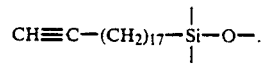

Then, the substrate was immersed in an aqueous solution of silver nitrate ($AgNO_3$) to replace H of $-C\equiv CH$ group by Ag under a metal acetylide reaction (FIG. 1B).

Then, the substrate on which one layer of an NTS adsorption film was formed was immersed in a toluene solution containing $MoCl_5$ as a metal salt catalyst, and the temperature of the solution was elevated to 40° C. to produce a metallized polyacetylene-type ultralong conjugated polymer having a metallized transpolyacetylene bond 3 under a reaction shown in FIG. 3C, i.e., a reaction using a metal salt catalyst. The production thereof was ascertained from UV spectrum.

In addition, the use of $WCl_6$, $NbCl_5$ or $TaCl_5$ as a metal salt catalyst also gave similar polymer films, although the molecular weights of the polymers were different. Further, when a substrate on which an NTS chemisorbed layer was formed was immersed in a $CCl_4$ solution containing $Mo(CO)_6$ or $W(CO)_6$ as a metal salt catalyst and irradiated with UV light, a polymer film having a different molecular weight depending upon the metal catalyst was obtained.

The chemisorbed layer produced according to the above process were insoluble in an alcohol solvent.

In addition, the metallized polyacetylenes produced as above were remarkably stable to heat, pressure, UV light, etc., even in oxygen-containing atmosphere as compared with conventional polyacetylene derivatives produced according to a Ziegler-Natta type catalyst method.

EXAMPLE 2

Figure 2A:
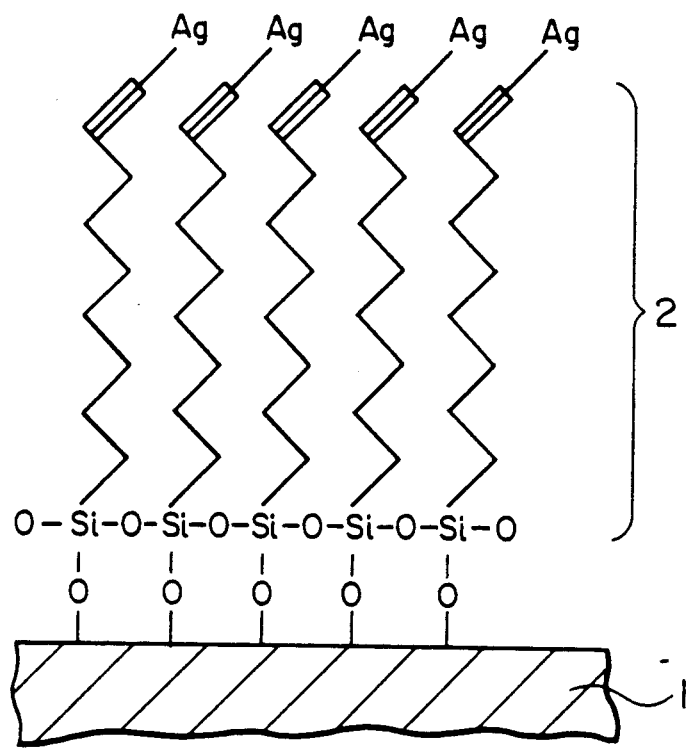
FIG. 2A shows a schematic view of an enlarged cross section, in a molecular order, of a substrate on which one chemisorbed layer of NTS is deposited and then Ag is substituted.
Figure 2B:
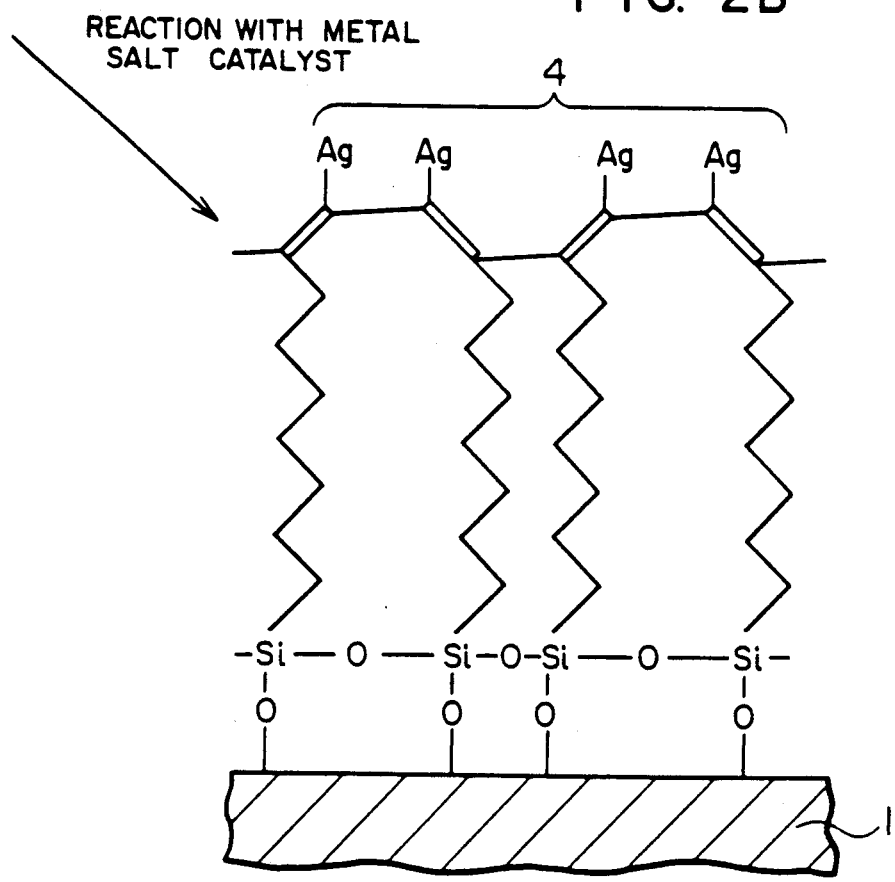
FIG. 2B shows a schematic view of an substrate and a chemisorbed layer in which a metallized cis- polyacetylene is formed by polymerization.

A Si substrate on which an NTS chemisorbed layer was deposited, prepared in the same way as in Example 1, was immersed in an aqueous solution of silver nitrate ($AgNO_3$) to replace H of $-C\equiv CH$ group by Ag under metal acetylide reaction (FIG. 2A), and then immersed in a solution of $MoCl_6$ as a metal salt catalyst in anisole, which is an oxygen-containing solvent. The temperature of the solution was elevated to 50° C. to show that a reaction product shown in FIG. 2B, i.e. metallized cis-polyacetylene-type ultralong conjugated polymer 4 was produced.

In addition, the chemisorbed layer produced according to the above process was insoluble in an alcohol solvent.

Further, the metallized polyacetylene produced as above was remarkably stable to heat, pressure, UV light, etc., even in oxygen-containing atmosphere as compared with conventional polyacetylene derivatives produced according to a Ziegler-Natta type catalyst method.

EXAMPLE 3

Using 1-(trimethylsilyl)-ω-nonadecylynoictrichlorosilane ($Si(CH_3)_3-C\equiv C-(CH_2)_{17}-SiCl_3$, hereinafter referred to as TMS-NTS), chemisorption was carried out in the same way as in Example 1. After the chemisorption, the substrate on which the chemisorbed layer was deposited was immersed in a 10% KOH aqueous solution to eliminate $-Si(CH_3)_3$ group, whereby a chemisorbed layer

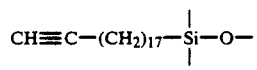

was formed.

This chemisorbed layer was treated in the same way as in Example 1 to give a metallized trans-polyacetylene-type ultralong conjugated polymer.

In addition, the chemisorbed layer produced according to the above process was insoluble in an alcohol solvent.

Further, the metallized polyacetylene produced as above was remarkably stable to heat, pressure, UV light, etc., even in oxygen-containing atmosphere as compared with conventional polyacetylene derivatives produced according to a Ziegler-Natta type catalyst method.

EXAMPLE 4

Figure 3D:
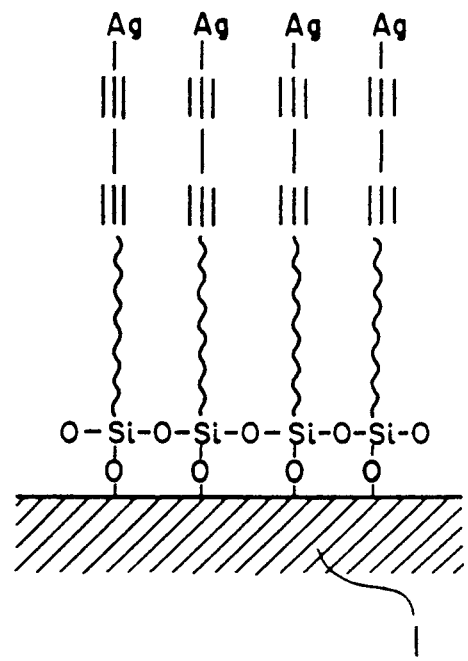
Figure 3E:
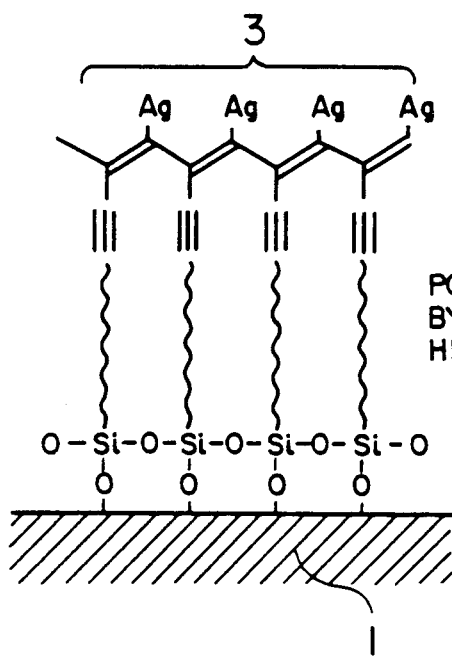
Figure 3F:
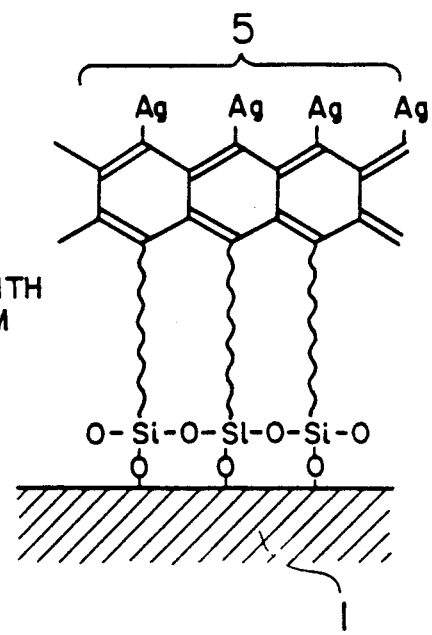

A chemisorbed layer (FIG. 3C) was deposited using tricosadiynoictrichlorosilane having one diacetylene group 10 ($H-C\equiv C-C\equiv C-(CH_2)_{19}-SiCl_3$, FIG. 3A and B), and then immersed in an aqueous solution of silver nitrate ($AgNO_3$) to replace H of $-C\equiv CH$ group by Ag under a metal acetylide reaction (FIG. 3D). Further, polymerization using a metal salt catalyst was carried out in the same way as in Example 1 to give a metallized polyacetylene-type ultralong conjugated polymer having a metallized trans-polyacetylene bond 3 in the form of a monomolecular layer (FIG. 3E). This metallized polyacetylene-type ultralong conjugated polymer was irradiated with electron beam for polymerization to give a metallized polyacene-type ultralong polymer having a metallized polyacenic bond 5 (FIG. 3F).

EXAMPLE 5

An example using ω-tricosynoic acid ($CH\equiv C-(CH_2)_{20}-COOH$, hereinafter referred to as TCA), which is one of amphiphilic acetylene derivatives, is explained.

A built up layer was prepared using Trough IV made by Joice-Loebl Co. in a clean room of class 100 under yellow lighting from which lights having wavelengths of not more than 500 nm were cut off. The interior of the clean room was adjusted at a room temperature of 23±1° C. and a humidity of 40±5%. The built up layer was prepared using a Si substrate having a diameter of 3 inches on which an oxide film was formed.

Molecules of TCA were collected with a barrier in the direction of the water surface on a water phase containing $CaCl_2$ and then an LB film of TCA was formed on the Si substrate 21. A built up layer 22 having a molecular arrangement shown in FIG. 4A was obtained.

Figure 4B:
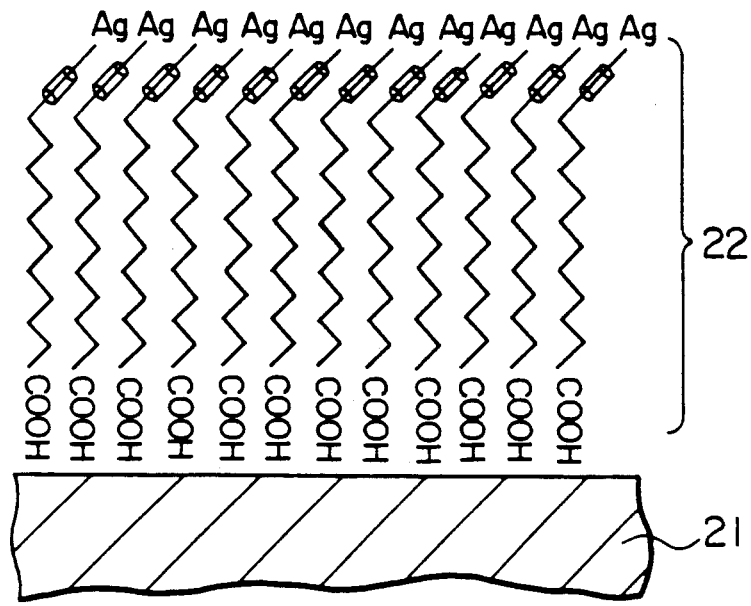
FIG. 4B shows a schematic view of an enlarged cross section, in a molecular order, of a substrate on which a Ag-attached built up layer of TCA is prepared.

Then, the substrate on which the built up layer of TCA was deposited was immersed in an aqueous solution of silver nitrate ($AgNO_3$) to replace H of $-C\equiv CH$ group with Ag under a metal acetylide reaction (FIG. 4B).

Figure 4C:
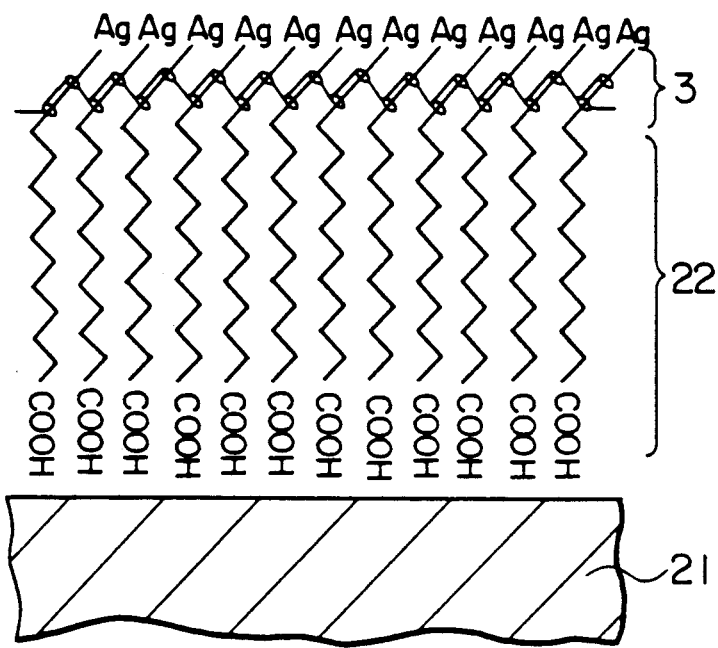
FIG. 4C shows a schematic view of an enlarged cross section, in a molecular order, of a substrate on which a metallized trans-polyacetylene is formed by polymerization.

Then, the substrate was immersed in toluene in which $MoCl_5$ was dissolved as a metal salt catalyst, and the temperature of the solvent was elevated to 30° C. to give a reaction product shown in FIG. 4C, i.e., a metallized polyacetylene-type ultralong conjugated polymer having a metallized trans-polyacetylenic bond 23. The production thereof was ascertained from an FTIR analysis.

In addition, the use of $WCl_6$, $NbCl_5$ or $TaCl_5$ as a metal salt catalyst also gave similar polymer films although they had different molecular weights. Further, a substrate on which the built up layer was formed was immersed in a solution of $Mo(CO)_6$ or $W(CO)_6$ as a metal catalyst in $CCl_4$, and irradiated with UV light to give a polymer film, although it had a different molecular weight depending upon the metal catalyst used.

EXAMPLE 6

The procedure of Example 5 was repeated to obtain a built up layer of TMS-TCA, except that 1-(tri-methylsilyl)-ω-tricosynoic acid ($Si(CH_3)_3-C\equiv C-(CH_2)_{20}-COOH$, hereinafter referred to as TMS-TCA) was used in place of TCA. A substrate on which the built up layer of TMS-TCA was deposited was immersed in a 10% KOH solution to eliminate $-Si(CH_3)_3$ group, whereby a monomolecular layer of CH≡C—(CH$_2$)$_{20}$—COOH was formed.

The above monomolecular layer was treated in the same way as in Example 5 to produce a metallized polyacetylene-type ultralong conjugated polymer having a metallized trans-polyacetylenic bond.

In addition, it was found that the built up layer produced according to the above process was insoluble in an alcohol solvent.

Further, the metallized polyacetylene produced as above was remarkable stable to heat, pressure or UV light even in oxygen-containing atmosphere as compared with conventional polyacetylene derivatives produced according to a Ziegler-Natta type catalyst method.

EXAMPLE 7

Figure 5A:
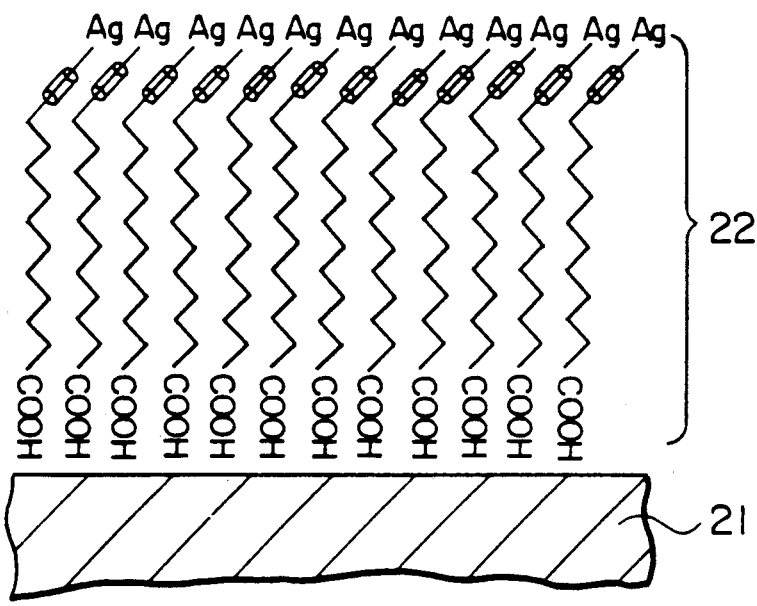
FIG. 5A shows a schematic view of an enlarged cross section, in a molecular order, of a substrate on which a Ag-attached built up layer of TCA is prepared.
Figure 5B:
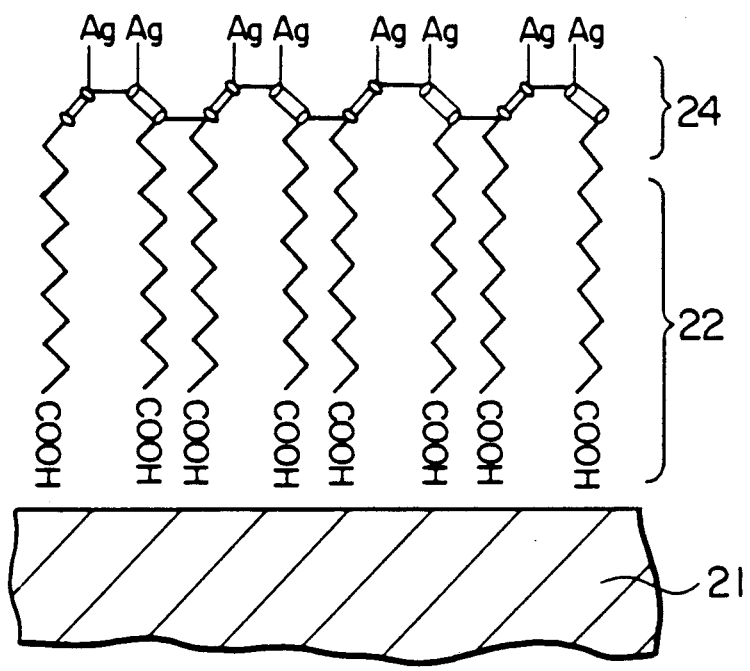
FIG. 5B shows a schematic view of an enlarged cross section, in a molecular order, of a substrate on which a metallized cis-polyacetylene is formed by polymerization.

A Si substrate on which one built up layer of ω-tricosynoic acid was prepared was immersed in an aqueous solution of silver nitrate (AgNO$_3$) to replace H of —C≡CH group with Ag (FIG. 5A), and then immersed in anisole, which is one of oxygen-containing solvents and in which MoCl$_6$ was dissolved as a metal salt catalyst. The temperature of the solvent was elevated to 60° C. to give a reaction product as shown in FIG. 5B, i.e., metallized polyacetylene-type ultralong conjugated polymer having a metallized cis-polyacetylenic bond 24. The production thereof was ascertained from an FTIR analysis.

It was also found that the built up layer formed according to the above process was insoluble in an alcohol solvent.

Further, the metallized polyacetylene produced as above was remarkably stable to heat, pressure or UV light even in oxygen-containing atmosphere as compared with conventional polyacetylene derivatives produced according to a Ziegler-Natta type catalyst method.

EXAMPLE 8

The procedure of Example 5 was repeated except that a d.c. voltage of 30 V was applied when the molecules were collected on a water surface in the direction of the water surface and a built up layer was prepared. As a result, monomer molecules were better oriented, and thus a metallized polyacetylene-type ultralong conjugated polymer having a longer conjugated bond system.

EXAMPLE 9

Figure 6D:
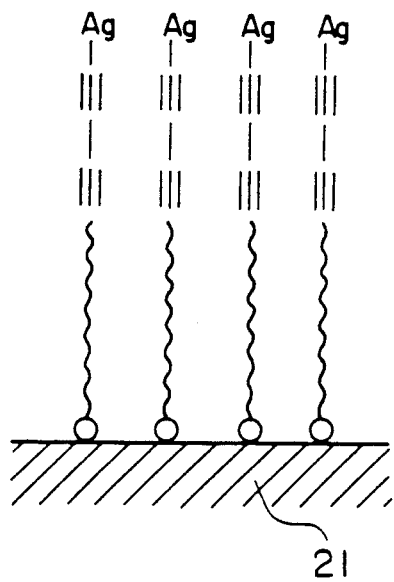
Figure 6E:
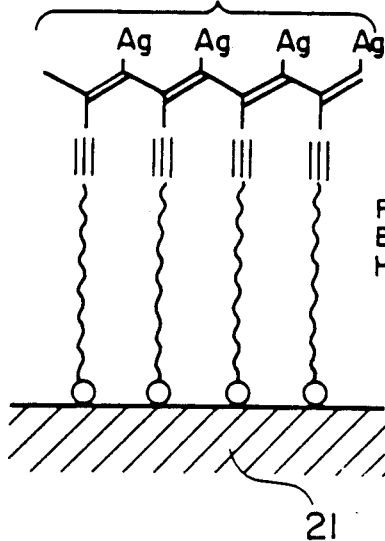

A built up layer (FIG. 6C) was prepared in the same way as in Example 5 except for using pentacosadiynoic acid having one diacetylene group (H—C≡C—C≡C—(CH$_2$)$_{20}$—COOH: FIGS. 6A and 6B) instead of TCA. The layer was immersed in an aqueous solution of silver nitrate (AgNO$_3$) to replace H of —C≡CH group with Ag (FIG. 6D), and polymerization was carried out using a metal salt catalyst in the same way as in Example 5 to give a metallized polyacetylene-type ultralong conjugated polymer having a trans-polyacetylenic bond 23 in the form of a monomolecular layer (FIG. 6E).

EXAMPLE 10

Figure 6F:
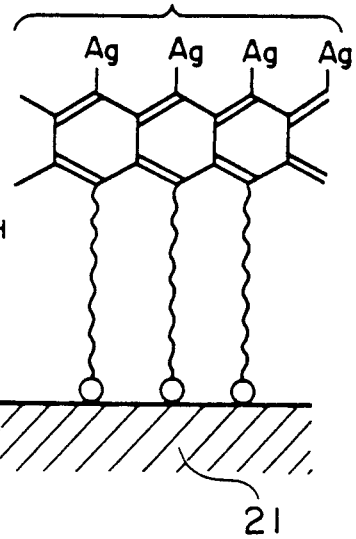

The metallized polyacetylene-type ultralong conjugated polymer obtained in Example 9 was irradiated with gamma rays for polymerization to give a metallized polyacene-type ultralong conjugated polymer having a polyacenic bond 25 (FIG. 6F).

What is claimed is:

1. A process for producing a metallized polyacetylene-type ultralong conjugated polymer comprising immersing a substrate having a hydrophilic surface in a first nonaqueous organic solution containing a compound containing an acetylenic group (—C≡C—) and

group (hereinafter referred to as silane-type surfactant) to deposit a chemisorbed layer of the silane-type surfactant on the substrate by chemisorption, immersing the substrate on which the chemisorbed layer is deposited in an aqueous solution containing a metal ion to replace a hydrogen atom connected to the acetylenic group by the metal atom, and immersing the substrate on which the chemisorbed layer is deposited in a second organic solution containing a metal salt catalyst to polymerize the molecules at the acetylenic group in the monomolecular film.

2. A process according to claim 1 wherein the silane-type surfactant has a diacetylene group (—C≡C—C≡C—).

3. A process according to claim 1 wherein the acetylene groups have an

group.

4. A process according to any of claims 1, 2 and 3 wherein the metal of the metal salt catalyst is selected from a group consisting of Mo, W, Nb and Ta.

5. A process according to claim 4 wherein the second organic solution contains an organic Sn or organic Bi compound as a co-catalyst in addition to the metal salt catalyst.

6. A process according to claim 5 wherein the organic solvent is an oxygen-containing solvent and the metal salt catalyst is MoCl$_5$ whereby a metallized cis-polyacetylene-type ultralong conjugated polymer is produced.

7. A process according to claim 1 wherein the metal ion is an ion of Ag or Cu.

8. A process according to claim 1 wherein the silane-type surfactant is ω-nonadecylynoictrichlorosilane.

9. A process according to claim 1 wherein the silane-type surfactant is 1-(trimethylsilyl)-ω-nonadecylynoictrichlorosilane.

10. A process for producing a metallized polyacene-type ultralong conjugated polymer comprising immersing a substrate having a hydrophilic surface in a first nonaqueous organic solution containing a compound containing a diacetylenic group (—C≡C—C≡C—) and

group (hereinafter referred to as silane-type surfactant) to deposit a chemisorbed layer of the silane-type surfactant on the substrate by chemisorption, immersing the substrate on which the chemisorbed layer is deposited in an aqueous solution containing a metal ion to replace a hydrogen atom connected to the diacetylenic group by the metal atom, immersing the substrate on which the chemisorbed layer is deposited in a second organic solution containing a metal salt catalyst to polymerize the molecules at the acetylene group in the chemisorbed layer and irradiating the chemisorbed layer with a high-energy beam.

11. A process for producing a metallized polyacetylene-type ultralong conjugated polymer comprising spreading an organic solution of a compound containing an acetylenic group (—C≡C—) and carboxyl group (—COOH) (hereinafter referred to as amphiphilic compound) on a water surface, evaporating a solvent of the organic solution, collecting the molecules of the amphiphilic compound remaining on the water surface in the direction of the water surface with a barrier on the water surface, applying a surface pressure to form a monomolecular film on the water surface, moving the substrate upward and downward such that the substrate crosses the monomolecular film under the surface pressure to prepare a built up layer on the substrate, immersing the substrate on which the built up layer is prepared in an aqueous solution containing a metal ion to replace a hydrogen atom connected to the acetylenic group by the metal atom, and immersing the substrate on which the built up layer is prepared in an organic solution containing a metal salt catalyst to polymerize the molecules at the acetylenic group.

12. A process according to claim 11 wherein the built up layer is prepared while the surface pressure is applied to the molecules of the amphiphilic compound and at the same time a d.c. voltage is applied in the direction of the water surface.

13. A process according to any of claims 11 and 12 wherein the water contains an inorganic salt.

14. A process according to any of claims 11 and 12 wherein the amphiphilic compound has a diacetylenic group (—C≡C—C≡C—).

15. A process according to any of claims 11 and 12 wherein the acetylenic group has a

group.

16. A process according to any of claims 11 and 12 wherein the metal of the metal salt catalyst is selected from a group consisting of Mo, W, Nb and Ta.

17. A process according to any of claims 11 and 12 wherein the organic solution contains an organic Sn or organic Bi compound as a co-catalyst in addition to the metal salt catalyst.

18. A process according to any of claims 11 and 12 wherein the organic solvent is an oxygen-containing solvent and the metal salt catalyst is $MoCl_5$.

19. A process according to claim 18 wherein the acetylenic group has a

group.

20. A process according to any of claims 11 and 12 wherein the amphiphilic compound is ω-tricosynoic acid.

21. A process according to any of claims 11 and 12 wherein the amphiphilic compound is 1-(trimethylsilyl)-ω-tricosynoic acid.

22. A process for producing a metallized polyacene-type ultralong conjugated polymer comprising spreading an organic solution of a compound containing a diacetylenic group (—C≡C—C≡C—) and carboxyl group (—COOH) (hereinafter referred to as amphiphilic compound) on a water surface, evaporating a solvent of the organic solution, collecting the molecules of the amphiphilic compound remaining on the water surface in the direction of the water surface with a barrier on the water surface, applying a surface pressure to form a monomolecular film on the water surface, moving the substrate upward and downward such that the substrate crosses the monomolecular film under the surface pressure to prepare a built up layer on the substrate, immersing the substrate on which the built up layer is prepared in an aqueous solution containing a metal ion to replace a hydrogen atom connected to the acetylenic group by the metal atom, immersing the substrate on which the built up layer is prepared in an organic solution containing a metal salt catalyst to polymerize the molecules at the acetylenic group and irradiating the built up layer with a high-energy beam.

23. A metallized polyacetylene-type ultralong conjugated polymer comprising metallized polyacetylenic bonds attached to a substrate via a siloxane group produced according to anyone of claims 1-3, 7-9.

24. A metallized polyacene-type ultralong conjugated polymer comprising metallized polyacenic bonds attached to a substrate via a siloxane group produced according to claim 10.

* * * * *